(12) United States Patent
Zhang

(10) Patent No.: US 12,547,813 B2
(45) Date of Patent: Feb. 10, 2026

(54) SIMULTANEOUS PLACEMENT AND ROUTING BASED METHOD AND APPARATUS FOR INCREMENTAL DESIGN OPTIMIZATION, AND COMPUTER DEVICE

(71) Applicant: Zhengxinyuan Technology (Hangzhou) Co., Ltd., Hangzhou (CN)

(72) Inventor: Lizheng Zhang, Hangzhou (CN)

(73) Assignee: ZHENGXINYUAN TECHNOLOGY (HANGZHOU) CO., LTD., Hangzhou (CN)

( * ) Notice: Subject to any disclaimer, the term of this patent is extended or adjusted under 35 U.S.C. 154(b) by 721 days.

(21) Appl. No.: 17/899,164

(22) Filed: Aug. 30, 2022

(65) Prior Publication Data

US 2023/0409799 A1 Dec. 21, 2023

(30) Foreign Application Priority Data

Jun. 21, 2022 (CN) .......................... 202210722993.8

(51) Int. Cl.
*G06F 30/398* (2020.01)
*G06F 30/392* (2020.01)
*G06F 30/394* (2020.01)

(52) U.S. Cl.
CPC .......... *G06F 30/398* (2020.01); *G06F 30/392* (2020.01); *G06F 30/394* (2020.01)

(58) Field of Classification Search
CPC .... G06F 30/392; G06F 30/39; G06F 2119/12; G06F 30/394; G06F 30/398; G06F 30/327; G06F 2119/06; G06F 30/367; G06F 30/3323; G06F 16/9577; G06F 30/3308; G06F 30/347; G06F 30/00; G06F 30/396; G06F 30/3312; G06F 30/18; G06F 1/10; G06F 2117/04; G06F 30/27; G06F 30/34; G06F 30/31; G06F 30/33; G06F 30/32; G06F 30/3315; G06F 2111/02;

(Continued)

(56) References Cited

U.S. PATENT DOCUMENTS

| | | | |
|---|---|---|---|
| 9,135,375 B1* | 9/2015 | Sood | G06F 30/00 |
| 11,030,377 B1* | 6/2021 | Chow | G06F 30/394 |
| 2015/0169819 A1* | 6/2015 | Hsu | G06F 30/398 |
| | | | 716/113 |

* cited by examiner

*Primary Examiner* — Binh C Tat
(74) *Attorney, Agent, or Firm* — Muncy, Geissler, Olds & Lowe, P.C.

(57) ABSTRACT

A simultaneous placement and routing based method and apparatus for incremental design optimization, and a computer device. The method includes according to a net-list file and a core constraint file acquired after logic synthesis, sequentially placing modules, each including units, on an initial coarse grid and simultaneously performing routing of each module and a placed module; performing iterative verification on placement and routing of the modules, and adjusting an illegal module and simultaneously adjusting routing of the illegal module according to a verification result, until requirements of the core constraint file are met; refining the grid, dividing each module into a plurality of sub-modules, and performing simultaneous placement and routing on the sub-modules in a refined grid; performing iterative verification and simultaneously adjusting placement and routing of illegal sub-modules; and repeating the above steps, until the iterative verification meets the requirements of the core constraint file and timing convergence.

18 Claims, 4 Drawing Sheets

(58) Field of Classification Search
CPC ............... G06F 2115/02; G06F 30/331; G06F 30/337; G06F 30/3947; G06F 30/3953; G06F 9/5033; G03F 1/36; G03F 1/70; H01L 21/76886; H01L 23/528; H01L 21/768
USPC .................................................. 716/100–106
See application file for complete search history.

SIMULTANEOUS PLACEMENT AND
ROUTING BASED METHOD AND
APPARATUS FOR INCREMENTAL DESIGN
OPTIMIZATION, AND COMPUTER DEVICE

TECHNICAL FIELD

The present invention relates to the field of electronic design automation of integrated circuits, in particular to a simultaneous placement and routing based method and apparatus for incremental design optimization, and a computer device.

BACKGROUND

Integrated circuit chip design is a project with a long process. From front-end circuit design to back-end layout design, all steps are closely related, and each step will affect the implementation result of the final chip. Physical implementation needs to be performed by placement and routing after front-end logic design synthesis is completed. In an existing placement and routing method, placement and routing are two separate steps. In the placement stage, when units are placed, routing is not completed; at this time, only estimated routing resources are allocated for the units and a congestion graph is formed to indicate how the routing resources are occupied; and placement of the units are adjusted based on the congestion graph. The flow diagram, that routing is performed after a placement, is as shown in FIG. 1.

The existing placement and routing method will have a big problem in nano-scale circuit design: the estimated available routing resources in the placement stage are often quite different from actual values required in a subsequent routing stage, that is to say, there is a problem of uncorrelation between placement and routing. Such problem of uncorrelation will cause large timing, power, and area mismatch before and after routing, resulting in poor circuit design quality.

At present, there is also a method for fast pre-routing in the placement stage. First, a routing resource graph needs to be generated. Then, during placement, the cost value for changing a logic module is calculated according to its placement environment, and the changed logic module is then subjected to fast placement and routing according to the routing resource graph. Next, according to the change of the cost value, it is judged whether the movement or exchange of the logic module is accepted, and the placement meets a set of conditions. However, there are still be two issues in this placement and routing approach: (1) Routing resources still need to be estimated from the routing resource graph, and there will still be mismatch between estimated routing resources and actual routing resources. (2) During placement, a real-time calculation of the cost value, based on the placement environment, and the routing resource condition will bring great difficulties to the operational speed of placement and routing, and especially for large-scale integrated circuits, this speed will become more prominent.

SUMMARY

In order to overcome the deficiencies in the prior art, the present invention provides a simultaneous placement and routing based method and apparatus for incremental design optimization, and a computer device.

In order to achieve the above objective, the present invention provides a simultaneous placement and routing based method and apparatus for incremental design optimization, including:
acquiring an information file generated after logic synthesis, the information file including a net-list file and multiple constraint files representing a logical relationship among units;
classifying the acquired multiple constraint files to form at least two or more constraint file types including a core constraint file type;
according to the net-list file and the core constraint files, sequentially placing modules, each including a plurality of the units, on an initial coarse grid and simultaneously performing routing of each of the modules and a placed module; based on a core constraint file, performing iterative verification on placement and routing of the modules; adjusting the position or size of an illegal module not meeting requirements of the core constraint file and simultaneously adjusting routing of the illegal module according to a verification result, until the placement and routing of a plurality of the modules meet the requirements of the core constraint file;
refining the grid, dividing each of the modules into a plurality of sub-modules, and performing simultaneous placement and routing on the plurality of sub-modules in a refined grid where each of the modules is located; performing iterative verification based on the core constraint file, and adjusting the position or size of an illegal sub-module not meeting the requirements of the core constraint file and simultaneously adjusting routing of the illegal sub-module according to a verification result, until the placement and routing of the plurality of sub-modules meet the requirements of the core constraint file; and
repeating the grid refinement, the sub-module subdivision, the simultaneous placement and routing of the subdivided sub-modules, the iterative verification, and the simultaneous adjustment of placement and routing of illegal subdivided sub-modules, until the iterative verification meets the requirements of the core constraint file and timing convergence.

According to an embodiment of the present invention, when the position of an illegal object not meeting the requirements of the core constraint file is adjusted, position information of the currently moving illegal object is captured in real time, and a virtual route is generated between the illegal object and an other object connected with the illegal object; based on the core constraint file, a static timing analysis is performed on the virtual route to generate the best moving position of the illegal object in the current grid and the corresponding virtual route is converted into an actual route; and the illegal object includes the illegal module, the illegal sub-module and an illegal subdivided module.

According to an embodiment of the present invention, the central position of the currently moving illegal object is captured in real time, and the positions of a plurality of signal ports of the illegal object are determined according to a structure of the illegal object; and the virtual route is generated between the signal ports of the illegal object and signal ports of the other object connected with the illegal object.

According to an embodiment of the present invention, when the positions of illegal objects are adjusted, the illegal objects are sequentially moved at equal intervals in a horizontal or vertical direction of the current grid based on the iterative verification result and the core constraint file.

According to an embodiment of the present invention, a position adjustment range of each of the illegal objects is within an area occupied by a parent object of the given illegal object.

According to an embodiment of the present invention, the net-list file expresses a signal transmission relationship between the units and the modules in a logic circuit, and the modules are inserted into the initial coarse grid in sequence according to an output direction of a signal in the net-list file during placement and routing.

According to an embodiment of the present invention, when each of the modules is placed, the specific position of a module to be placed and a routing resource actually required by the module to be placed are determined by an iterative calculation of the wire length and a time delay based on the core constraint file, the position of the placed module, and a logical connection relationship between the module to be placed and the placed module, and the module to be placed is moved to the position determined by the iterative calculation so as to complete routing.

According to an embodiment of the present invention, when the acquired multiple constraint files are classified, the constraint files other than the core constraint file are reclassified to form secondary constraint files; and when the modules, the sub-modules, and subdivided modules are placed, routing resources of the modules, the sub-modules, and the subdivided modules constrained by the secondary constraint files are expanded according to a preset proportion.

According to an embodiment of the present invention, when the grid is refined, a grid spacing is gradually reduced in a preset equal proportion; alternatively, a rule of proportion reduction is gradually reduced to refine the grid.

According to an embodiment of the present invention, the core constraint file includes a timing constraint file, a physical constraint file, and a partial process constraint file.

According to an embodiment of the present invention, the iterative verification includes timing verification and physical verification, and a path violating the core constraint file and an illegal object involved in the path are output after each iterative verification is completed.

In another aspect, the present invention further provides a simultaneous placement and routing based apparatus for incremental design optimization, including an acquisition module, a classification module, a placement and routing module, a verification module, and a grid refinement module. The acquisition module acquires an information file generated after logic synthesis, the information file including a net-list file and multiple constraint files representing a logical relationship among units. The classification module classifies the acquired multiple constraint files to form at least two or more constraint file types including a core constraint file type. The placement and routing module sequentially places modules, each including a plurality of units, on an initial coarse grid and simultaneously performs routing of each of the modules and a placed module according to the net-list file and the core constraint file. The verification module performs iterative verification on placement and routing of the modules based on the core constraint file. The placement and routing module adjusts the position or size of an illegal module not meeting requirements of the core constraint file and simultaneously adjusts routing of the illegal module according to a verification result, until the placement and routing of a plurality of the modules meet the requirements of the core constraint file. The grid refinement module refines the grid, and the placement and routing module divides each of the modules into a plurality of sub-modules and performs simultaneous placement and routing on the plurality of sub-modules in a refined grid where each of the modules is located. The verification module performs iterative verification based on the core constraint file, and the placement and routing module adjusts the position or size of an illegal sub-module not meeting the requirements of the core constraint file and simultaneously adjusts routing of the illegal sub-module according to a verification result, until the placement and routing of the plurality of sub-modules meet the requirements of the core constraint file. repeating the grid refinement, the sub-module subdivision, the simultaneous placement and routing of the subdivided sub-modules, the iterative verification, and the simultaneous adjustment of placement and routing of illegal subdivided sub-modules, until the iterative verification meets the requirements of the core constraint file and timing convergence.

According to an embodiment of the present invention, when the position of an illegal object not meeting the requirements of the core constraint file is adjusted, position information of the currently moving illegal object is captured in real time, and a virtual route is generated between the illegal object and an other object connected with the illegal object; based on the core constraint file, a static timing analysis is performed on the virtual route to generate the best moving position of the illegal object in the current grid and the corresponding virtual route is converted into an actual route; and the illegal object includes the illegal module, the illegal sub-module and an illegal subdivided module.

According to an embodiment of the present invention, the central position of the currently moving illegal object is captured in real time, and the positions of a plurality of signal ports of the illegal object are determined according to a structure of the illegal object; and the virtual route is generated between the signal ports of the illegal object and signal ports of the other object connected with the illegal object.

According to an embodiment of the present invention, when the positions of illegal objects are adjusted, the placement and routing module sequentially moves the illegal objects at equal intervals in a horizontal or vertical direction of the current grid based on the iterative verification result and the core constraint file.

According to an embodiment of the present invention, when the positions of the illegal objects are adjusted, the placement and routing module adjusts the positions of the illegal objects within areas occupied by parent objects of the illegal objects.

According to an embodiment of the present invention, based on a signal transmission relationship, between the units and the modules in a logic circuit, expressed by the net-list file, the placement and routing module inserts the modules into the initial coarse grid in sequence according to an output direction of a signal during placement; and when each of the modules is placed, the specific position of a module to be placed and a routing resource actually required by the module to be placed are determined by an iterative calculation of the wire length and a time delay based on the core constraint file, the position of the placed module, and a logical connection relationship between the module to be placed and the placed module, and the module to be placed is moved to the position determined by the iterative calculation so as to complete routing.

According to an embodiment of the present invention, when the acquired multiple constraint files are classified, the classification module reclassifies the constraint files other than the core constraint file to form secondary constraint files; and when the modules, the sub-modules, and subdivided modules are placed, the placement and routing module expands routing resources of the modules, the sub-modules, and the subdivided modules constrained by the secondary constraint files according to a preset proportion.

In another aspect, the present invention further provides a computer device including a memory, a processor, and computer programs stored in the memory and executable on the processor, where the processor performs the steps of the above simultaneous placement and routing based method for incremental design optimization when executing the computer programs.

In another aspect, the present invention further provides a computer readable storage medium storing computer programs which, when executed by a processor, cause the processor to perform the steps of the above simultaneous placement and routing based method for incremental design optimization.

In conclusion, the simultaneous placement and routing based method for incremental design optimization provided by the present invention is a progressive simultaneous placement and routing method based on gradual refinement of the grid and the module. According to the method, the iteration is performed based on the core constraint file in each placement of the positions of the objects to simultaneously complete routing of the objects, that is to say, routing constraints are consumed immediately during iteration in placement, and the wire length between the objects and parasitic parameters, affecting a timing sequence, on a wire are actually determined. Therefore, placement and routing resources of the objects are completely correlated, and there is no problem of routing skip after the placement and routing are completed; and the problem that routing resources are uncorrelated in a placement stage and a routing stage existing in the existing placement and routing method is well solved. In terms of optimization speed, the gradual refinement of the grid and the module gradually decomposes the calculation amount of iterative verification, such that each unit can gradually and quickly converge to a target position; and the iterative verification based on the core constraint file also further increases the speed of iterative verification, such that the simultaneous placement and routing based method for incremental design optimization provided by the present invention has the excellent routing rate while realizing the simultaneous placement and routing to ensure the routing quality.

In order to make the above-mentioned and other objectives, features, and advantages of the present invention more obvious and easy to understand, the preferred embodiments are described in detail below with reference to the accompanying drawings.

DETAILED DESCRIPTION OF EMBODIMENTS

Figure 1:
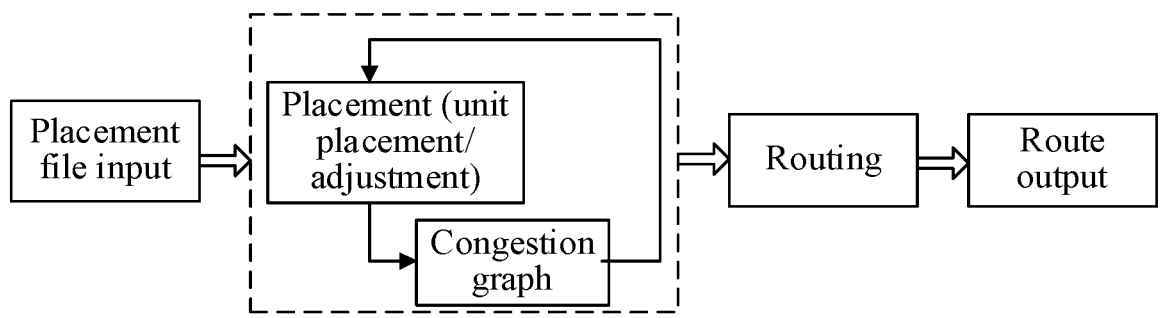
FIG. 1 shows a schematic block diagram of a principle of an existing placement and routing method.
Figure 2:
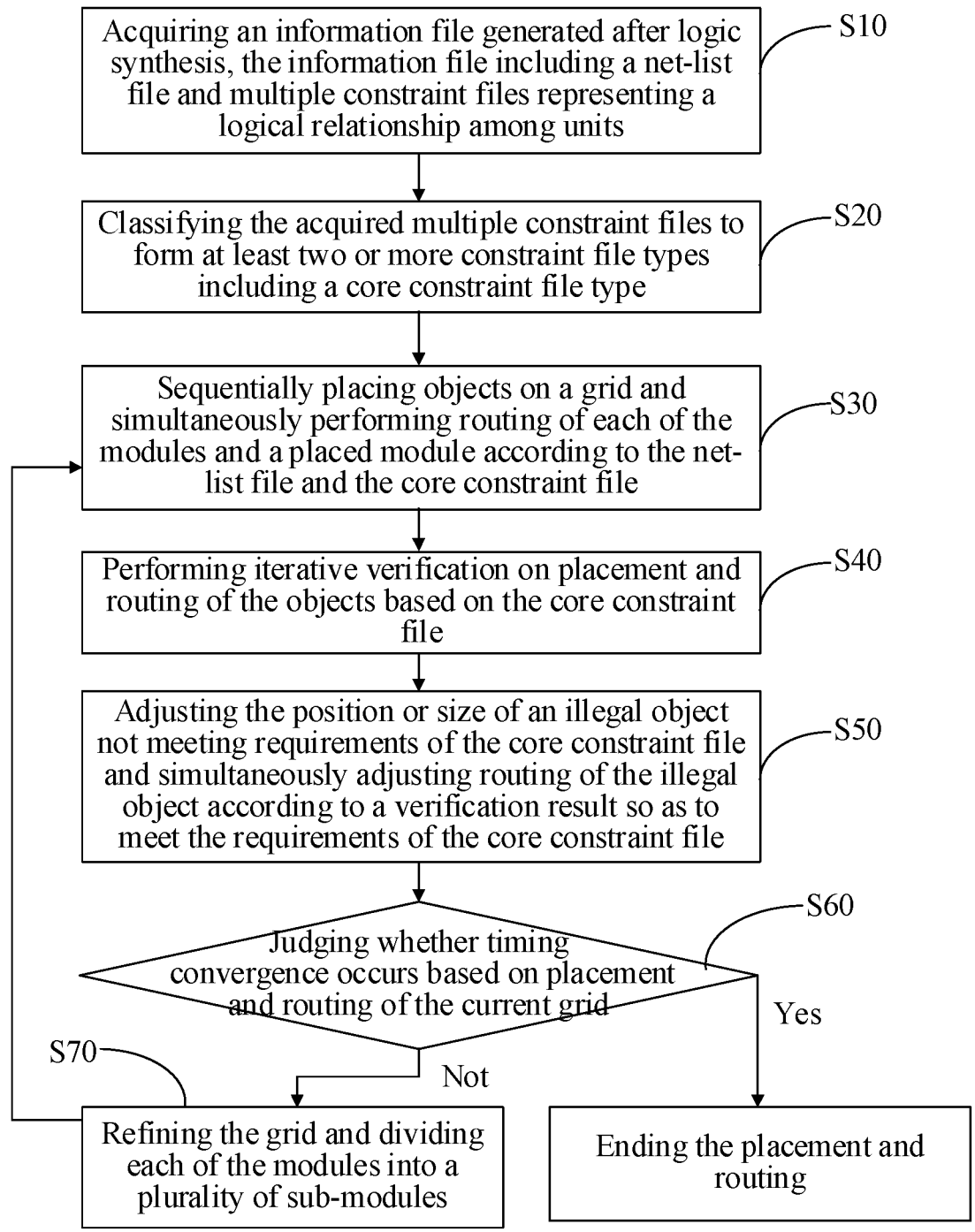
FIG. 2 shows a flowchart of a simultaneous placement and routing based method for incremental design optimization provided by an embodiment of the present invention.
Figure 3:
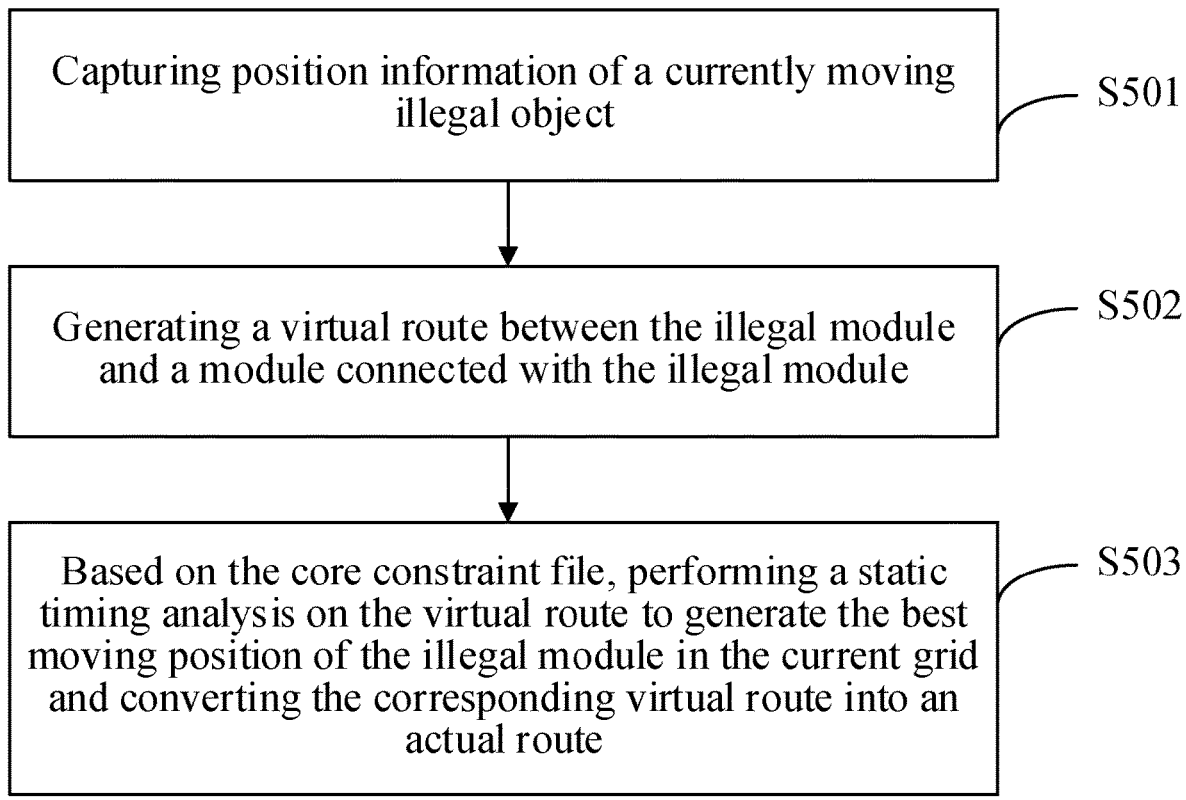
FIG. 3 shows a flowchart of Step S50 in FIG. 2.
Figure 4:
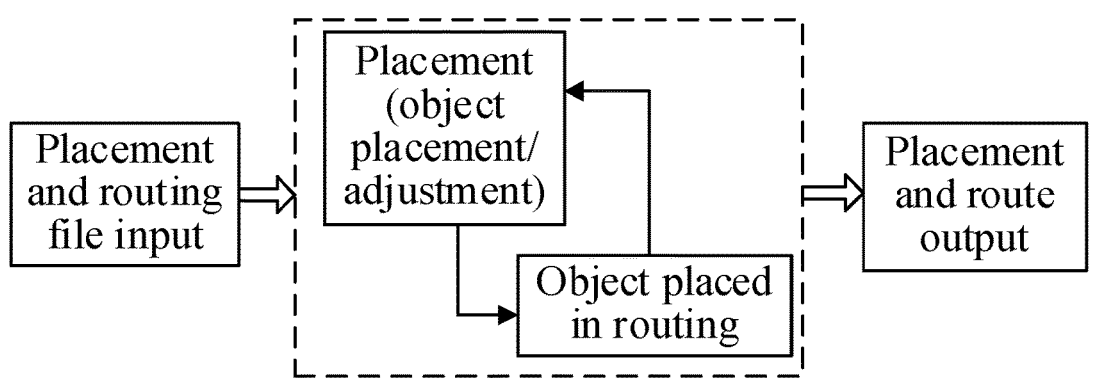
FIG. 4 shows a schematic block diagram of a principle of the flowchart shown in FIG. 2.

As shown in FIG. 1, in an existing placement and routing method, placement and routing are two independent steps. In a placement stage, the placement positions of units will be continuously adjusted according to a congestion graph and an estimated routing resource will be configured for each unit. Routing is performed after the congestion graph indicates that a placement meets requirements. In this placement and routing method, the estimated routing resource in the placement stage is an estimated value, which is often quite different from an actual routing resource required in a routing stage, resulting in the problem of uncorrelation between placement and routing, seriously affecting circuit performance after routing, and even the need of re-placement planning and placement in severe cases.

In view of this, this embodiment provides a simultaneous placement and routing based method with complete correlation for incremental design optimization. The method includes:

an information file generated after logic synthesis is acquired, where the information file includes a net-list file and multiple constraint files representing a logical relationship among units;

the acquired multiple constraint files are classified to form at least two or more constraint file types including a core constraint file type;

according to the net-list file and the core constraint files, modules each including a plurality of the units are sequentially placed on an initial coarse grid and routing of each of the modules and a placed module is simultaneously performed; based on a core constraint file, iterative verification is performed on placement and routing of the modules; the position or size of an illegal module not meeting requirements of the core constraint file is adjusted and routing of the illegal module is simultaneously adjusted according to a verification result, until the placement and routing of a plurality of the modules meet the requirements of the core constraint file;

the grid is refined, each of the modules is divided into a plurality of sub-modules, and simultaneous placement and routing are performed on the plurality of sub-modules in a refined grid where each of the modules is located; iterative verification is performed based on the core constraint file, and the position or size of an illegal sub-module not meeting the requirements of the core constraint file is adjusted and routing of the illegal sub-module is simultaneously adjusted according to a verification result, until the placement and routing of the plurality of sub-modules meet the requirements of the core constraint file; and repeating the grid refinement, the sub-module subdivision, the simultaneous placement and routing of the subdivided sub-modules, the iterative verification, and the simultaneous adjustment of placement and routing of illegal subdivided sub-modules, until the iterative verification meets the requirements of the core constraint file and timing convergence.

A working principle of the simultaneous placement and routing based method for incremental design optimization provided by this embodiment will be described in detail below with reference to FIGS. 2 to 5.

Since back-end layout design is physical implementation of a front-end logic circuit, Step S10 is first performed to acquire the information file after the logic synthesis of the front-end circuit so as to form a placement and routing input. The information file mainly includes the net-list file and the multiple constraint files representing the logical relationship among the units. For the net-list file, it is a result of the front-end logic synthesis, which is usually embodied in a hardware description language, such as a Verilog format. A structure of the circuit design and the logical connection relationship among the units are described in the net-list file. The constraint files include a timing constraint file that the circuit design needs to meet, a physical constraint file for pin assignment and pin level setting, a process constraint file, and a user design constraint file.

In the existing placement and routing method, all constraint conditions involved in layout planning and layout will be comprehensively considered, thereby estimating the positions of the units and resources required for routing. However, during actual layout design, not physical implementations of all circuit designs take into account all the constraint files. The fact proves that not all the constraint conditions can be met after placement and routing are completed. As a result, in the simultaneous placement and routing based method for incremental design optimization provided by this embodiment, after the constraint files are acquired in Step S10, Step S20 is performed, in which the acquired multiple constraint files are classified to form the at least two or more constraint file types including the core constraint file type.

In this embodiment, the core constraint file includes the timing constraint file, the physical constraint file, and a partial process constraint file. The partial process constraint file specifically refers to a macro process constraint file, such as the wire width that characterizes the manufacturing capability of a process manufacturer. However, the present invention does not make any limitation thereto. In other embodiments, based on selection of a user for other constraint files, a constraint file selected by the user is added to a given core constraint file, and combination is performed to form the core constraint file. Alternatively, in other embodiments, a general core constraint file may be provided for the user according to types of front-end circuits with different functions and different scales; alternatively, the core constraint file is automatically recommended for the user based on historical selection of the user for the core constraint file. The selection of the core constraint file in Step S20 provides a basis for subsequent synchronization of placement and routing.

Then, placement and routing are performed. In the simultaneous placement and routing based method for incremental design optimization provided by this embodiment, simultaneous placement and routing, iterative verification, and placement and routing adjustment need to be performed after each grid refinement. Therefore, for the convenience of description, the modules, the sub-modules, and the subdivided modules are referred to as objects. Specifically, the object referred to in the initial coarse grid is the module including the plurality of units; the object referred to in a refined grid is the sub-module after the module is divided; and the object in a repeatedly refined grid is the subdivided sub-module.

Figure 5:
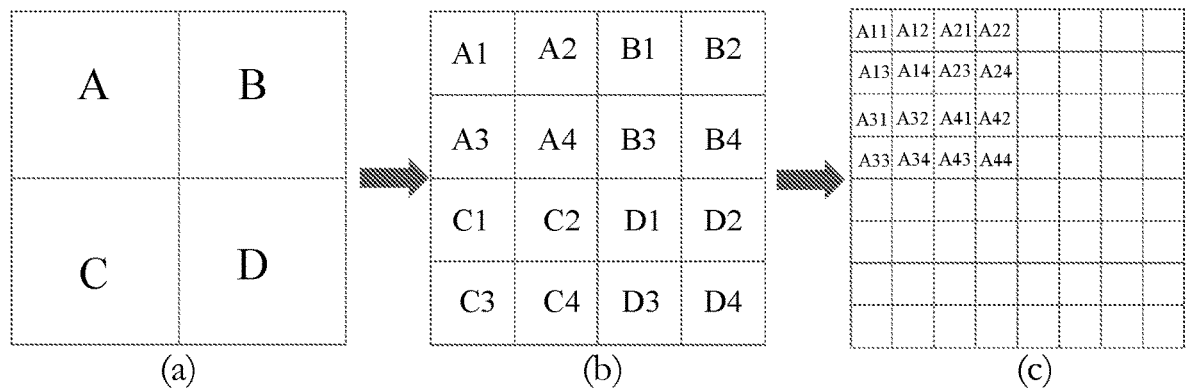
FIG. 5 shows a schematic diagram of gradual refinement of a grid and gradual subdivision of a module in a simultaneous placement and routing based method for incremental design optimization provided by an embodiment of the present invention.
Figure 6:
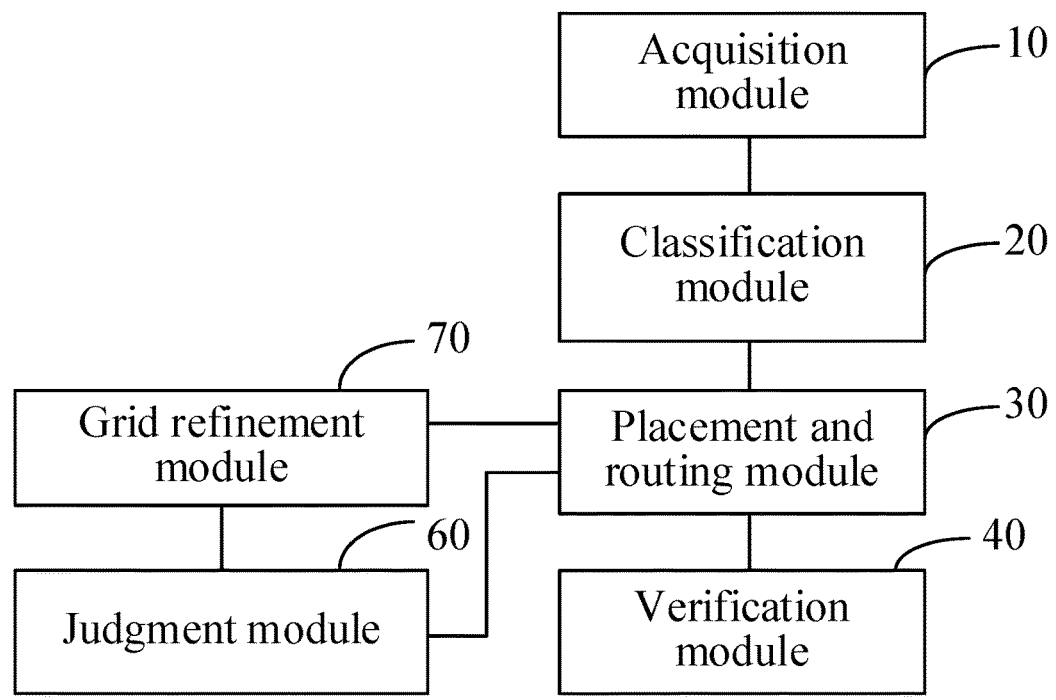
FIG. 6 shows a schematic structural diagram of a simultaneous placement and routing based apparatus for incremental design optimization provided by an embodiment of the present invention.

Step S30: the objects (modules) are sequentially placed on the initial coarse grid and the routing of each of the objects (modules) and the placed object (module) is simultaneously performed according to the net-list file and the core constraint file. As shown in FIG. 5, four modules A, B, C, and D are placed in the initial coarse grid, and each of the modules includes a plurality of units. This embodiment is described only by taking the placement and routing of the four modules as an example. However, the present invention does not make any limitation thereto. In an actual integrated circuit, a very large number of modules will be formed according to the functions of the circuit.

Since the net-list file expresses a signal transmission relationship between the units and the modules in a logic circuit, the modules may be inserted into the initial coarse grid as shown in FIG. 5(*a*) in sequence according to an output direction of a signal during placement. When each of the modules is placed, the specific position of a module to be placed and a routing resource actually required by the module to be placed are determined by an iterative calculation of the wire length and a time delay based on the core constraint file, the position of the placed module, and a logical connection relationship between the module to be placed and the placed module. Finally, the module to be placed is moved to the position determined by the iterative calculation so as to complete routing. In this step, the determination of the specific position of the module to be placed has simultaneously consumed the constraint file required for its routing, and the optimization of the wire length and the time delay is achieved simultaneously in this step, such that there is no routing congestion or skip of the modules after routing.

After the placement and routing of the modules are completed in the initial coarse grid, Step S40 is performed, in which the iterative verification is performed on the placement and routing of the objects (modules) based on the core constraint file. The iterative verification includes timing verification and physical verification. A path violating the core constraint file and an illegal object (module) involved in the path are output after the verification is completed.

After the illegal module is acquired in Step S40, Step S50 is performed, in which the placement and routing module is called and the position or size of the illegal object (module) not meeting the requirements of the core constraint file is adjusted and the routing of the illegal object (module) is simultaneously adjusted according to the verification result so as to meet the requirements of the core constraint file. Specifically, Step S50, when the position of the illegal object not meeting the requirements of the core constraint file is adjusted, includes: (Step S501) position information of the currently moving illegal object is captured in real time; (Step S502) a virtual route is generated between the illegal object and an object connected with the illegal object; and (Step S503) based on the core constraint file, a static timing analysis is performed on the virtual route to generate the best moving position of the illegal object in the current grid and the corresponding virtual route is converted into an actual route.

For Step S501, since the length and width of each unit are predetermined in a unit library, a structure and the positions of a plurality of signal ports on the structure of the module including the plurality of units are also determined accordingly. The central position of the currently moving illegal module is captured in real time, and the positions of the plurality of signal ports of the illegal module are determined according to the length and width of the illegal object, such that the virtual route is generated between the signal ports of the illegal module and signal ports of the module connected with the illegal module. However, the present invention does not make any limitation thereto. In other embodiments, one of signal ports of each illegal module may also be used as an object captured in real time, and then the positions of other signal ports are calculated based on the structure of the module.

Since the position of each object (module) has quickly converged to near a target position in the current grid based on the core constraint file during placement and routing in Step S30, the illegal object (module) does not need to be subjected to large-range position adjustment and position exchange with other modules, and only needs to be adjusted near a current position based on a current grid spacing during movement in Step S501. In order to facilitate the real-time capture of the moving positions of the illegal objects (modules), in this embodiment, the illegal objects (modules) are set to sequentially move at equal intervals in a horizontal or vertical direction of the current grid, where a movement spacing is an integer multiple of the current grid spacing.

In Step S50, this embodiment is described by taking an example where the illegal object (module) is moved to meet the constraint file. However, the present invention does not make any limitation thereto. In other embodiments, requirements of the physical constraint and the timing constraint on the path may also be met by changing the width of the object (module); alternatively, the requirements of the core constraint file may also be met in combination with the adjustment of the position and width of the illegal object (module).

Obviously, the placement and routing based on the initial coarse grid cannot meet the requirements of the timing convergence, such that after the placement and routing on the initial grid meet the requirements of the core constraint file, Step S70 is performed, in which the grid is refined and each module is divided into the plurality of sub-modules. As shown in FIG. 5(b), a grid spacing after refinement is 50% of the previous grid spacing, that is to say, a 2*2 grid is subdivided into a 4*4 grid. Meanwhile, the module A is divided into four sub-modules A1, A2, A3, and A4; the module B is divided into four sub-modules B1, B2, B3, and B4; the module C is divided into four sub-modules C1, C2, C3, and C4; and the module D is divided into four sub-modules D1, D2, D3, and D4.

Then, simultaneous placement and routing are performed on the multiple sub-modules in a refined grid where each module is located by means of the method in Step S30, that is to say, the four sub-modules A1, A2, A3, and A4 are placed in an area, occupied by the module A, in the initial grid, that is, in four grids at an upper right corner in FIG. 5(b). During placement of the positions of the four sub-modules A1, A2, A3, and A4, routing of each other is completed based on the core constraint file. Based on the same way, placement of these sub-modules B1 to B4, C1 to C4, and D1 to D4 is completed.

Then, Step S40 is performed, in which the iterative verification is performed on the placement and routing of the objects based on the core constraint file. At this time, the objects refer to the sub-modules, and the illegal objects refer to sub-modules on the path violating the core constraint file.

Next, Step S50 is performed, in which the position or width of the illegal sub-module is adjusted and the routing of the illegal sub-module and other sub-modules is simultaneously adjusted based on Steps S501 to S503 to make all the sub-modules meet the requirements of the core constraint file.

After the iterative verification in Step S40 and the adjustment of placement and routing of the illegal sub-module in Step S50, Step S60 is performed, in which it is judged whether timing convergence occurs in the placement and routing based on the current grid compared to the previous placement and routing. Specifically, it is judged whether timing convergence occurs in placement and routing in FIG. 5(b) compared to placement and routing in FIG. 5(a). If yes, it indicates that the placement and routing of the units meet the requirements, such that the placement and routing are completed. If not, Step S70 of further refining the grid, as shown in FIG. 5(c), to form an 8*8 grid continues to be performed. The corresponding sub-module will also be subdivided into a plurality of subdivided sub-modules; for example, the sub-module A1 will be divided into four subdivided sub-modules A11, A12, A13, and A14; the sub-module A2 will be divided into four subdivided sub-modules A21 to A24; the sub-module A3 is divided into four subdivided sub-modules A31 to A34; and the sub-module A4 is divided into four subdivided sub-modules A41 to A44. Then, Step S30 of placing the four subdivided sub-modules A11 to A14 in an area, occupied by the sub-module A1, in FIG. 5(b) (that is, in four grids in an upper right corner of FIG. 5(c)) and simultaneously completing routing of the four sub-modules A11 to A14 is repeated. Based on the same way, simultaneous placement and routing of other subdivided sub-modules are implemented.

After the placement and routing of the subdivided sub-modules are completed, the verification in Step S40 and the adjustment of placement and routing of the illegal subdivided sub-modules in Step S50 are performed. Next, Step S60 is performed again, in which it is judged whether timing convergence occurs in placement and routing in FIG. 5(c) compared to placement and routing in FIG. 5(b). If yes, it indicates that the sub-modules are refined to the units and the placement and routing of the units meet the requirements, such that the placement and routing are completed. If not, Step S70 (further grid refinement and sub-module subdivision) to Step S30 to Step S40 to Step S50 to Step S60 continue to be performed, until the placement and routing meet the requirements of the core constraint file and the timing convergence.

In the simultaneous placement and routing based method for incremental design optimization provided by this embodiment, the actual routing wire length among the multiple objects and parasitic parameters, affecting time delay calculation, on a wire are simultaneously determined based on the core constraint file during object placement, thereby realizing complete correlation of placement and routing resources.

On one hand, a progressive placement and routing method based on grid refinement and module subdivision makes each iterative verification only need to concern the iteration based on the core constraint file between the objects subjected to current placement and routing, thus greatly reducing the calculation amount of iterative verification, and realizing fast simultaneous placement and routing. On the other hand, this method also makes each object converge in the area occupied by its parent object, thus greatly reducing the adjustment range of the illegal object. For example, the sub-module A1 converges in the area occupied by the module A, such that the adjustment of the position of the illegal sub-module A1 is only limited to fine adjustment in the area occupied by the module A, the sub-module A1 and the sub-module B1 will not be exchanged in position, a large number of calculations caused by movement in a large range is avoided, and the rate of simultaneous placement and routing is greatly increased, thereby well solving the problem of low iterative rate of simultaneous placement and routing in the prior art. The simultaneous placement and routing based method for incremental design optimization provided in this embodiment can be compatible with the speed and quality of placement and routing, and is a method for placement and routing optimization that can achieve better circuit performance, lower power consumption, larger area, and shorter operating time.

As shown in FIG. 5, in this embodiment, the grid spacing is gradually reduced in a preset equal proportion when the grid is refined, for example, the grid spacing after refinement is 50% of the previous grid spacing. In FIG. 5, (a) is the initial coarse grid; (b) is a grid after primary refinement; and (c) is a grid after secondary refinement. However, the present invention does not make any limitation thereto. In other embodiments, with gradual reduction of the grid spacing, the refinement proportion can also be reduced, for example, a difference between the grid spacing after refinement and the previous grid spacing is 25%.

During placement and routing, some areas, such as sensitive areas where special signal lines such as a power line, an earth line, and a clock line are located, on the logic circuit will have special requirements. Some related constraint conditions will be possibly generated after logic synthesis for these areas. When the constraint files related to these sensitive areas are not included in the core constraint file, the constraint files other than the core constraint file are reclassified to form the secondary constraint files for the constraint files related to the sensitive areas in Step S20. In Step S30, when each object is placed, the routing resources of the objects constrained by the secondary constraint files are expanded according to the preset proportion. For example, when the modules are placed on the initial grid, for the power line and the earth line, original routing resources are expanded by 5% to 20% to meet requirements of anti-interference performance and other performance; and after the grid is refined, when the sub-modules are placed, the original routing resources are expanded by the preset proportion for the area involving the clock line. Similarly, a system can automatically generate the secondary constraint files for the user according to different logic circuit structures, and can also add or reduce basic secondary constraint files based on selection of the user. However, the present invention does not make any limitation thereto.

In correspondence to the simultaneous placement and routing based method for incremental design optimization, this embodiment further provides a simultaneous placement and routing based apparatus for incremental design optimization, including an acquisition module 10, a classification module 20, a placement and routing module 30, a verification module 40, and a grid refinement module 70. The acquisition module 10 acquires an information file generated after logic synthesis, the information file including a net-list file and multiple constraint files representing a logical relationship among units. The classification module 20 classifies the acquired multiple constraint files to form at least two or more constraint file types including a core constraint file type. The placement and routing module 30 sequentially places modules, each including a plurality of units, on an initial coarse grid and simultaneously performs routing of each of the modules and a placed module according to the net-list file and the core constraint file. The verification module 40 performs iterative verification on placement and routing of the modules based on the core constraint file. The placement and routing module 30 adjusts the position or size of an illegal module not meeting requirements of the core constraint file and simultaneously adjusts routing of the illegal module according to a verification result, until the placement and routing of a plurality of the modules meet the requirements of the core constraint file. The grid refinement module 70 refines the grid, and the placement and routing module 30, based on Step S50, divides each of the modules into a plurality of sub-modules and performs simultaneous placement and routing on the plurality of sub-modules in a refined grid where each of the modules is located. The verification module performs verification based on the core constraint file, and the placement and routing module 30 adjusts the position or size of an illegal sub-module not meeting the requirements of the core constraint file and simultaneously adjusts routing of the illegal sub-module according to a verification result, until the placement and routing of the plurality of sub-modules meet the requirements of the core constraint file. For the adjustment of placement and routing after grid refinement, a judgment module 60 will judge whether timing convergence occurs in placement and routing in a current grid compared to placement and routing in a previous grid. If the timing convergence occurs, the placement and routing are completed. If the timing convergence does not occur, the grid refinement module 70 further refines the grid, the placement and routing module 30 further subdivides the sub-module, the verification module 40 performs verification again, the placement and routing module 30 adjusts the position and routing of the illegal object based on a verification structure again, and finally, the judgment module 60 judges whether the timing convergence occurs again. The above steps are repeated until the iterative verification meets the requirements of the core constraint file and the timing convergence.

The core constraint file includes a timing constraint file, a physical constraint file, and a partial process constraint file.

In this embodiment, the placement and routing module 30, when adjusting the position of an illegal object not meeting the requirements of the core constraint file, captures position information of the currently moving illegal object in real time, and generates a virtual route between the illegal object and an other object connected with the illegal object; based on the core constraint file, a static timing analysis is performed on the virtual route to generate the best moving position of the illegal object in the current grid and the corresponding virtual route is converted into an actual route; and the illegal object includes the illegal module, the illegal sub-module and an illegal subdivided module.

Specifically, since the length and width of each unit are predetermined in a unit library, a structure and the positions of a plurality of signal ports on the structure of the object such as the module including the plurality of units, the sub-module, and the subdivided sub-module are also determined accordingly. The central position of the currently moving illegal object is captured in real time, and the positions of a plurality of signal ports of the illegal object are determined according to the length and width of the illegal object, such that the virtual route is generated between the signal ports of the illegal object and signal ports of the module connected with the illegal object. However, the present invention does not make any limitation thereto. In other embodiments, one of signal ports of each illegal object may also be used as an object captured in real time, and then the positions of other signal ports are calculated based on the structure of the object. With gradual subdivision of the module, when the module is subdivided into the units, the signal ports correspond to pins of the units.

In this embodiment, the classification module 20 reclassifies the constraint files other than the core constraint file to form secondary constraint files for the constraint files related to sensitive areas. The placement and routing module 30, when sequentially placing the objects on the initial coarse grid, expands routing resources of the objects constrained by the secondary constraint files according to a preset proportion. For example, original routing resources are expanded by 5% to 20% to meet requirements of anti-interference performance and other performance for a power line, an earth line, and a clock line.

The function and implementation process of each module in the above-mentioned apparatus are detailed in the implementation process of the corresponding step in the above-mentioned method, and will not be repeated here.

In another aspect, this embodiment further provides a computer device including a memory, a processor, and computer programs stored in the memory and executable on the processor, where the processor performs the steps of the above simultaneous placement and routing based method for incremental design optimization when executing the computer programs.

In another aspect, this embodiment further provides a computer readable storage medium storing computer programs which, when executed by a processor, cause the processor to perform the steps of the above simultaneous placement and routing based method for incremental design optimization.

In conclusion, the simultaneous placement and routing based method for incremental design optimization provided by the present invention is a progressive simultaneous placement and routing method based on gradual refinement of the grid and the module. According to the method, the iteration is performed based on the core constraint file in each placement of the positions of the objects to simultaneously complete routing of the objects, that is to say, routing constraints are consumed immediately during iteration in placement, and the wire length between the objects and parasitic parameters, affecting a timing sequence, on a wire are actually determined. Therefore, placement and routing resources of the objects are completely correlated, and there is no problem of routing skip after the placement and routing are completed; and the problem that routing resources are uncorrelated in a placement stage and a routing stage existing in the existing placement and routing method is well solved. In terms of optimization speed, the gradual refinement of the grid and the module gradually decomposes the calculation amount of iterative verification, such that each unit can gradually and quickly converge to a target position; and the iterative verification based on the core constraint file also further increases the speed of iterative verification, such that the simultaneous placement and routing based method for incremental design optimization provided by the present invention has the excellent routing rate while realizing the simultaneous placement and routing to ensure the routing quality.

Although the present invention has been disclosed as above by the preferred embodiments, the preferred embodiments are not intended to limit the present invention. Anyone skilled in the art may make some changes and modifications without departing from the spirit and scope of the present invention. Therefore, the scope of protection of the present invention should be subject to the scope of protection of the claims.

The invention claimed is:

1. A simultaneous placement and routing based method for incremental design optimization, comprising:

acquiring an information file generated after logic synthesis, the information file comprising a net-list file and multiple constraint files representing a logical relationship among units;

classifying the acquired multiple constraint files to form at least two or more constraint file types comprising a core constraint file type;

according to the net-list file and the core constraint files, sequentially placing modules, each comprising a plurality of the units, on an initial coarse grid and simultaneously performing routing of each of the modules and a placed module; based on a core constraint file, performing iterative verification on placement and routing of the modules; adjusting the position or size of an illegal module not meeting requirements of the core constraint file and simultaneously adjusting routing of the illegal module according to a verification result, until the placement and routing of a plurality of the modules meet the requirements of the core constraint file, wherein when each of the modules is placed, the specific position of a module to be placed and a routing resource actually required by the module to be placed are determined by an iterative calculation of the wire length and a time delay based on the core constraint file, the position of the placed module, and a logical connection relationship between the module to be placed and the placed module, and the module to be placed is moved to the position determined by the iterative calculation so as to complete routing;

refining the grid, dividing each of the modules into a plurality of sub-modules, and performing simultaneous placement and routing on the plurality of sub-modules in a refined grid where each of the modules is located; performing iterative verification based on the core constraint file, and adjusting the position or size of an illegal sub-module not meeting the requirements of the core constraint file and simultaneously adjusting routing of the illegal sub-module according to a verification result, until the placement and routing of the plurality of sub-modules meet the requirements of the core constraint file; and repeating the grid refinement, the sub-module subdivision, the simultaneous placement and routing of the subdivided sub-modules, the iterative verification, and the simultaneous adjustment of placement and routing of illegal subdivided sub-modules, until the iterative verification meets the requirements of the core constraint file and timing convergence.

2. The simultaneous placement and routing based method for incremental design optimization according to claim 1, wherein when the position of an illegal object not meeting the requirements of the core constraint file is adjusted, position information of the currently moving illegal object is captured in real time, and a virtual route is generated between the illegal object and an other object connected with the illegal object; based on the core constraint file, a static timing analysis is performed on the virtual route to generate the best moving position of the illegal object in the current grid and the corresponding virtual route is converted into an actual route; and the illegal object comprises the illegal module, the illegal sub-module and an illegal subdivided module.

3. The simultaneous placement and routing based method for incremental design optimization according to claim 2, wherein the central position of the currently moving illegal object is captured in real time, and the positions of a plurality of signal ports of the illegal object are determined according to a structure of the illegal object; and the virtual route is generated between the signal ports of the illegal object and signal ports of the other object connected with the illegal object.

4. The simultaneous placement and routing based method for incremental design optimization according to claim 2, wherein when the positions of illegal objects are adjusted, the illegal objects are sequentially moved at equal intervals in a horizontal or vertical direction of the current grid based on the iterative verification result and the core constraint file.

5. The simultaneous placement and routing based method for incremental design optimization according to claim 4, wherein a position adjustment range of each of the illegal objects is within an area occupied by a parent object of the given illegal object.

6. The simultaneous placement and routing based method for incremental design optimization according to claim 1, wherein the net-list file expresses a signal transmission relationship between the units and the modules in a logic circuit, and the modules are inserted into the initial coarse grid in sequence according to an output direction of a signal in the net-list file during placement and routing.

7. The simultaneous placement and routing based method for incremental design optimization according to claim 1, wherein when the acquired multiple constraint files are classified, the constraint files other than the core constraint file are reclassified to form secondary constraint files; and when the modules, the sub-modules, and subdivided modules are placed, routing resources of the modules, the sub-modules, and the subdivided modules constrained by the secondary constraint files are expanded according to a preset proportion.

8. The simultaneous placement and routing based method for incremental design optimization according to claim 1, wherein when the grid is refined, a grid spacing is gradually reduced in a preset equal proportion; alternatively, a rule of proportion reduction is gradually reduced to refine the grid.

9. The simultaneous placement and routing based method for incremental design optimization according to claim 1, wherein the core constraint file comprises a timing constraint file, a physical constraint file, and a partial process constraint file.

10. The simultaneous placement and routing based method for incremental design optimization according to claim 1, wherein the iterative verification comprises timing verification and physical verification, and a path violating the core constraint file and an illegal object involved in the path are output after each iterative verification is completed.

11. A computer device comprising a memory, a processor, and computer programs stored in the memory and executable on the processor, wherein the processor performs the steps of the simultaneous placement and routing based method for incremental design optimization according to claim 1 when executing the computer programs.

12. A computer readable storage medium storing computer programs, wherein the computer programs, when executed by a processor, cause the processor to perform the steps of the simultaneous placement and routing based method for incremental design optimization according to claim 1.

13. A simultaneous placement and routing based apparatus for incremental design optimization, comprising:
an acquisition module for acquiring an information file generated after logic synthesis, the information file comprising a net-list file and multiple constraint files representing a logical relationship among units;
a classification module for classifying the acquired multiple constraint files to form at least two or more constraint file types comprising a core constraint file type;
a placement and routing module for sequentially placing modules, each comprising a plurality of units, on an initial coarse grid and simultaneously performing routing of each of the modules and a placed module according to the net-list file and the core constraint file;
a verification module for performing iterative verification on placement and routing of the modules based on the core constraint file, the placement and routing module adjusting the position or size of an illegal module not meeting requirements of the core constraint file and simultaneously adjusting routing of the illegal module according to a verification result, until the placement and routing of a plurality of the modules meet the requirements of the core constraint file; and
a grid refinement module for refining the grid, the placement and routing module dividing each of the modules into a plurality of sub-modules and performing simultaneous placement and routing on the plurality of sub-modules in a refined grid where each of the modules is located, the verification module performing verification based on the core constraint file, the placement and routing module adjusting the position or size of an illegal sub-module not meeting the requirements of the core constraint file and simultaneously adjusting routing of the illegal sub-module according to an iterative verification result, until the placement and routing of the plurality of sub-modules meet the requirements of the core constraint file, and
repeating the grid refinement, the sub-module subdivision, the simultaneous placement and routing of the subdivided sub-modules, the iterative verification, and the simultaneous adjustment of placement and routing of illegal subdivided sub-modules, until the iterative verification meets the requirements of the core constraint file and timing convergence wherein based on a signal transmission relationship, between the units and the modules in a logic circuit, expressed by the net-list file, the placement and routing module inserts the modules into the initial coarse grid in sequence according to an output direction of a signal during placement; and when each of the modules is placed, the specific position of a module to be placed and a routing resource actually required by the module to be placed are determined by an iterative calculation of the wire length and a time delay based on the core constraint file, the position of the placed module, and a logical connection relationship between the module to be placed and the placed module, and the module to be placed is moved to the position determined by the iterative calculation so as to complete routing.

14. The simultaneous placement and routing based apparatus for incremental design optimization according to claim 12, wherein when the position of an illegal object not meeting the requirements of the core constraint file is adjusted, the placement and routing module captures position information of the currently moving illegal object in real time, and a virtual route is generated between the illegal object and an other object connected with the illegal object; based on the core constraint file, a static timing analysis is performed on the virtual route to generate the best moving position of the illegal object in the current grid and the corresponding virtual route is converted into an actual route; and the illegal object comprises the illegal module, the illegal sub-module and an illegal subdivided module.

15. The simultaneous placement and routing based apparatus for incremental design optimization according to claim 13, wherein the placement and routing module captures the central position of the currently moving illegal object in real time, and determines the positions of a plurality of signal ports of the illegal object according to a structure of the illegal object; and the virtual route is generated between the signal ports of the illegal object and signal ports of the other object connected with the illegal object.

16. The simultaneous placement and routing based apparatus for incremental design optimization according to claim 13, wherein when the positions of illegal objects are adjusted, the placement and routing module sequentially moves the illegal objects at equal intervals in a horizontal or vertical direction of the current grid based on the iterative verification result and the core constraint file.

17. The simultaneous placement and routing based apparatus for incremental design optimization according to claim 15, wherein when the positions of the illegal objects are adjusted, the placement and routing module adjusts the positions of the illegal objects within areas occupied by parent objects of the illegal objects.

18. The simultaneous placement and routing based apparatus for incremental design optimization according to claim 13, wherein when the acquired multiple constraint files are classified, the classification module reclassifies the constraint files other than the core constraint file to form secondary constraint files; and when the modules, the sub-modules, and subdivided modules are placed, the placement and routing module expands routing resources of the modules, the sub-modules, and the subdivided modules constrained by the secondary constraint files according to a preset proportion.

* * * * *